United States Patent Office 3,646,141
Patented Feb. 29, 1972

3,646,141
HALOHYDROXYACRYLAMIDES AND PROCESS
FOR MAKING SAME
David I. Randall, Easton, Pa., assignor to
GAF Corporation, New York, N.Y.
No Drawing. Continuation of abandoned application Ser.
No. 617,821, Feb. 28, 1967. This application Sept. 18,
1969, Ser. No. 859,491
Int. Cl. C07c *103/58*
U.S. Cl. 260—562 B                8 Claims

ABSTRACT OF THE DISCLOSURE

The compounds are of the class of 2-halo-3-hydroxyacrylamides, a species being 2,3',4'-trichloro-3-hydroxyacrylanilide, useful as herbicides, fungicides, corrosion inhibitors, antioxidants and additives for lube oils.

---

This application is a continuation of Ser. No. 617,821, filed Feb. 28, 1967, now abandoned.

This invention relates to novel chemical compositions, particularly to new 2-halo-3-hydroxyacrylamides, and to processes for preparing the same.

Broadly, this invention contemplates, as a new chemical composition, a 2 - halo-3-hydroxyacrylamide corresponding to the formula

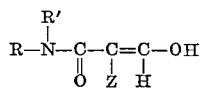

where R and R' represent hydrogen or organic radicals having from 1 to 20 carbon atoms, including saturated and unsaturated aliphatic hydrocarbons, aromatic hydrocarbons, heterocyclic and cycloaliphatic radicals and where Z represents a halogen group such as chloro or bromo. R and R' together may form an N-heterocyclic compound. When R and/or R' represent radicals other than hydrogen as described above, such radicals may contain substitutions thereon of one or more of the following groups: chloro, bromo, iodo, fluoro, —NO₂, —CF₃, hydroxy, —SO₂N(R)₂, —SO₂R, carboxy, alkoxy, alkyl or aryl, where R is an organic radical as defined above.

In highly preferred embodiments, this invention contemplates substituted 2 - halo - 3 - hydroxyacrylanilides of the formula

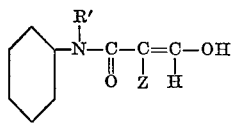

where R' represents hydrogen or a methyl group, Z represents chloro or bromo and wherein the aryl group may be substituted by one or more of the following groups; chloro, bromo, iodo, fluoro, —NO₂, —CF₃, —SO₂N(R)₂, —SO₂R, carboxy, alkoxy, alkyl or aryl but preferably not more than two of the radicals selected from the group consisting of —NO₂, —SO₂N(R)₂ and —SO₂R are substituted on the phenyl radical.

It is expressly intended that the formulae represented above be understood to encompass and represent both tautomeric forms which are in equilibrium therewith:

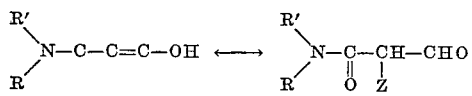

Representative compounds falling within the scope of this invention include:

2-chloro-3-hydroxyacryl-1-N-naphthylamide
2,2',3'-trichloro-3-hydroxyacrylanilide
4'-nitro-2-chloro-3-hydroxyacrylanilide
2-chloro-3-hydroxyacrylanilide
3'-nitro-2-chloro-3-hydroxyacrylanilide
2,3'-dichloro-4'-methyl-3-hydroxyacrylanilide
2,4'-dichloro-3'-trifluoromethyl-3-hydroxyacrylanilide
2',4'-dinitro-2-chloro-3-hydroxyacrylanilide
4'-phenoxy-2-chloro-3-hydroxyacrylanilide
2-chloro-3-hydroxyacryl-1-N-benzylamide
2-chloro-3-hydroxyacryl-N,N-dibutylamide
N-(2-chloro-3-hydroxyacryloyl) morpholine The novel compounds of this invention may be prepared by amidation of an amine corresponding to the formula R(R')NH by reaction with the 2,3-dihaloacryloyl halide in the presence of an acid acceptor, followed by hydrolysis in an alkaline medium of the corresponding 2,3-dihaloacrylamide.

The amidation reaction of the appropriate primary or secondary amine or ammonia with 2,3-dihaloacryloyl halide may be represented by the following equation:

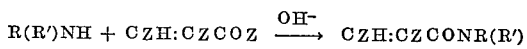

While this reaction may in many cases be carried out by mixing and reacting together the amine and dihaloacryloyl halide in the presence of an acid acceptor, it is preferably carried out in an inert solvent. As examples of suitable solvents may be mentioned benzene, toluene, dimethylformamide, dioxane, dimethylsulfoxide, diethyl ether, chlorobenzene, hexane, methyl ethyl ketone, etc., chlorinated solvents such as carbon tetrachloride, chloroform, chlorobenzene and the like, or mixtures of the above mentioned organic solvents in the presence or absence of water. Acid acceptors which may be used, include any suitable alkali such as alkali metal oxides, hydroxides, alkoxides and the like, e.g. sodium or potassium hydroxide, ethoxide or methoxide, alkaline earth metal oxides and hydroxides such as calcium oxide, calcium hydroxide, alkaline reacting salts of a strong base and a weak acid such as alkali metal carbonates, or bicarbonates, e.g. sodium or potassium carbonate or bicarbonate, sodium acetate and the like, alkaline salts such as trisodium phosphate, or if desired, an excess of ammonia, primary or secondary amino starting products.

The temperature of the reaction is not critical and the temperatures of 0 to 210° C. have been found to be operative. In order to effect complete reaction with a reasonable time, temperatures of from room temperature to 150° C. are generally used, and the reaction may be conveniently carried out at reflux using a solvent boiling at about the reaction temperature desired.

On completion of the amidation reaction, the resultant 2,3-dihaloacrylamide is hydrolyzed to the corresponding 2-halo-3-hydroxyacrylamide in accordance with the following equation:

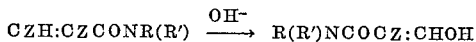

2,3-dihaloacrylamide is dissolved in a mixture of trialkylamine catalyst, acid acceptor, water, and solvent and heated to induce hydrolysis. Preferable water soluble organic solvents include, but are not limited to, lower aliphatic alcohols, glycol ethers, monoethyl ether of ethylene glycol, acetone, dioxane and the like. Suitable acid acceptors include both organic and inorganic bases including but not limited to suitable alkali and alkali metal oxides, hydroxides, alkoxides, carbonates, bicarbonates, acetates and the like. While the temperature of the hydrolysis is not critical, temperatures ranging from 50° to 100° C. are ordinarily used.

If the 2,3-dihaloacrylamide was prepared in a water soluble inert solvent or in an aqueous medium, it is not essential that the 2,3-dihaloacrylamide be recovered therefrom prior to hydrolysis, but the entire reaction product may be subjected to hydrolysis without purification.

Examples of dihaloacryloly halides useful as starting materials, include:

α,β-dichloroacryloyl chloride
α,β-diboromacryloyl bromide
α,β-dibromoacryloyl chloride
α,β-dichloroacryloyl bromide
α-bromo-β-chloroacryloyl bromide
α-chloro-β-bromoacryloyl chloride Illustrative of the amines falling within the formula R(R′)NH and reactive with the above mentioned dihaloacryloyl halides, are:

ammonia
methylamine
butylamine
aniline
diethanolamine
3-aminoformanilide
4-aminophenol
m-phenylenediamine
m-aminodiphenylene oxide
p-phenoxyaniline
p-anisidine
metachloroaniline
4-chloro-2-anisidine
2,4-dichloroaniline
5-nitro-4-chloro-2-anisidine
4-aminodiphenyl
o-chloroaniline
4-aminodiphenylsulfone
sodium salt of 2,5-dichloro-3-aminobenzoic acid
3,4-dichloroaniline
sulfanilamide
α-naphthylamine
p-nitroaniline
4-chloro-3-trifluoromethyl aniline
m-aminobenzoic acid
p-aminobenzoic acid
1-aminoanthraquinone
benzylamine
diethylamine
alkylamine
2,4-dichlorobenzylamine
pyrrolidine
pyrrole
2-aminobenzimidazole
2-aminothiazole
4-aminobenzimidazole
piperidine
carbazole, potassium salt
morpholine
piperazine
2-aminoquinoline
2-aminopyridine
2-aminobenzthiazole The following examples are included herein solely by way of illustration and are not intended to be construed as limitations upon this invention.

EXAMPLE I

A solution of 318 cc. (3.0 moles) of dichloroacryloyl chloride in 1750 cc. of diethyl ether was added dropwise to a two phase system of 486 grams (3.0 moles) of 3,4-dichloroaniline in 3750 cc. of diethyl ether as the top phase covering a lower phase consisting of a solution of 420 grams (5.0 moles) of sodium bicarbonate in 5000 cc. of water. During the addition, the temperature was held at 10° C. and the two phase system was thereafter stirred for 10 hours at room temperature. The ether was thereafter completely evaporated, the solids filtered and recrystallized from methanol. 651 grams of 2,3,3′,4′-tetrachloroacrylanilide was recovered as a white, crystalline solid, having a melting point ranging from 93.5 to 95° C.

A solution of 7000 cc. of methanol, 2175 cc. of a 25% aqueous trimethylamine solution and 651 grams of 2,3,3′,4′-tetrachloroacrylanilide prepared in a manner as described above was stirred at a temperature of from 40–50° C. for one hour whereupon a finely divided precipitate appeared. 45 cc. of a 20% Na$_2$CO$_3$ solution was added and heating was continued for an additional hour at 60° C., then 1630 cc. of water was added. The suspension was stirred for an additional 24 hours, filtered, the precipitate was washed with water and dried. The precipitate, recrystallized from a methanol-water solution, had a melting point of 146–148° C. and was identified as 2,3′,4′-trichloro-3-hydroxyacrylanilide.

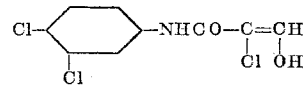

EXAMPLE II

A solution of 0.15 mole (15.8 cc.) of dichloroacryloyl chloride in 100 cc. of diethyl ether was added dropwise to a two phase system of 27.6 grams (0.2 mole) of 4-nitroaniline in 500 cc. of diethyl ether covering a solution of 30 grams of sodium bicarbonate in 500 cc. of water. The procedure outlined in Example I was thereafter followed yielding 4′-nitro-2,3-dichloroacrylanilide having a melting point ranging from 172 to 173° C. This product was thereafter hydrolyzed in the manner described in Example I yielding the final product 4′ - nitro-2-chloro-3-hydroxyacrylanilide having a melting point ranging from 195 to 198° C.

EXAMPLE III

A solution of 42.4 cc. (0.4 mole) of dichloroacryloyl chloride in 100 cc. of diethyl ether was added dropwise to a two phase system of 37.6 grams (0.4 mole) of aniline in 200 cc. of diethyl ether covering a solution of 33.6 grams of sodium bicarbonate in 400 cc. of water. The procedure outlined in Example I was thereafter followed yielding 2,3-dichloroacrylaniline which was thereafter hydrolyzed to 2-chloro-3-hydroxyacrylanilide having a melting point ranging from 73 to 79° C.

EXAMPLE IV

The procedure of Example II was followed, using α-naphthylamine as starting amine. The product, 2-chloro-3-hydroxyacryl-1-N-naphthylamide had a melting point ranging from 154–157° C.

EXAMPLE V

The procedure of Example I was followed, using as starting amine 2-nitroaniline. The product 2′-nitro-2-chloro-3-hydroxy acrylanilide had a melting point ranging from 168 to 170° C.

EXAMPLE VI

The procedure of Example I was followed, using as starting amine, 3-chloroaniline. The product 2,3′-dichloro-3-hydroxyacrylanilide had a melting point ranging from 101 to 106° C.

EXAMPLE VII

The procedure of Example I was followed, using as starting amine, 3-chloro-4-methylaniline. The product 2,3′-dichloro-4′-methyl-3-hydroxyacrylanilide had a melting point ranging from 108 to 110° C.

EXAMPLE VIII

The procedure of Example I was followed, using as starting amine, N-methylaniline. The product N-methyl-2-chloro-3-hydroxyacrylanilide was an oil.

EXAMPLE IX

The procedure of Example I was followed, using as starting amine, 3-trifluoromethyl-4-chloroaniline. The product 2,4' - dichloro-3'-trifluoromethyl-3-hydroxyacrylanilide had a melting point ranging from 96–101° C.

EXAMPLE X

The procedure of Example I was followed, using as starting amine, 3-aminobenzoic acid. The product 2- chloro-3'-carboxy-3-hydroxyacrylanilide was found to decompose at temperatures exceeding 100° C.

EXAMPLE XI 31.5 grams of 4'-nitro-2,3-dichloroacrylanilide prepared as the first step in Example II was dissolved in 150 cc. of 96% sulfuric acid at 5 to 10° C. To this solution was added 22.8 grams of one-third nitric acid two-thirds sulfuric acid and the mixture stirred at 30 to 32° C. for six hours. The mixture was thereafter drowned in ice and water, filtered and the product 4',6'-dinitro-2,3-dichloroacrylanilide having a melting point ranging from 114° to 119° C. recovered. This product was thereafter hydrolyzed in the manner described in Example I yielding 4',6'-dinitro-2-chloro - 3 - hydroxyacrylanilide having a melting point ranging from 189 to 194° C.

EXAMPLE XII

A solution of 0.1 mole (11.7 grams) of dichloroacryloyl chloride in 30 cc. of diethyl ether was added to a two phase system of 0.1 mole (10.7 grams) of benzylamine, 50 cc. of diethyl ether and 100 cc. of water containing 8.3 grams of sodium bicarbonate. The reaction mixture was stirred for several hours and thereafter the ether evaporated. The solids were filtered, washed, dried and had a melting point of 55° C.

The amide so obtained was dissolved in 315 cc. of methanol. To this solution was added 90 cc. of 25% trimethylamine solution and this solution was heated at 40–50° C. for 1 hour. Thereafter 67 cc. of a 20% sodium carbonate solution was added and heating was continued for an additional hour at 60° C. After standing, 25 cc. of water were added. The crystalline precipitate 2-chloro-3-hydroxyacryl-1-N-benzylamide was filtered off, dried and had a melting point ranging from 103–107°.

The 2-halo - 3 - hydroxyacrylamides described and obtained according to the hereinabove mentioned process may be utilized as herbicides, fungicides, corrosion inhibitors, antioxidants, and additives for lube oils.

In particular, the 2-halo-3-hydroxyacrylamides hereinabove described have been found to be particularly effective in controlling and eradicating nut sedge (*Cyperus esculentus*) in agronomic and horticultural areas. Compounds of the nature herein described have been applied on a preemergence and postemergence basis with excellent results. In one such experiment 2,3',4'-trichloro-3-hydroxyacrylanilide (Compound 1) of Example I and 4'-nitro-2-chloro-3-hydroxyacrylanilide (Compound 2) of Example II were each applied on a preemergence basis to soil freshly sown with tubers of yellow nut sedge. Application rates equivalent to 2 and 4 pounds of Compounds 1 and 2 were applied respectively per acre of soil surface. For purpose of comparison an untreated control was provided along with other areas treated with 3',4'-dichloropropionanilide (Compound 3), 3'-chloro-2-methylvalertoluidide (Compound 4), 3',4'-dichloromethacrylanilide (Compound 5), 3',4'-dichloro-2-methylvaleranilide (Compound 6), the latter Compounds 3–6 not being within the instant inventive concept. After approximately 4 weeks Compounds 1 and 2 demonstrated 100% control of nut sedge whereas the control area and those areas treated with Compounds 3 through 6 showed a total absence of control over the growth of nut sedge plants. In the same manner similar results were realized on a postemergence basis.

While this invention has been described in terms of certain preferred embodiments and illustrated by means of specific examples, these are illustrative only, and the invention is not to be construed as limited, except as set forth in the following claims.

What is claimed is:
1. A 2-halo-3-hydroxyacrylamide corresponding to the formula

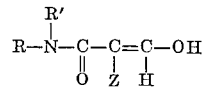

wherein R and R' are hydrogen, alkyl or hydroxyalkyl radicals of up to 4 carbon atoms, no more than one of R and R' being hydrogen; R and R' together with the amido-nitrogen atom form a heterocyclic ring selected from pyrrolidine, pyrrole, piperidine, carbazole, morpholine, piperazine; or R' is hydrogen or methyl and R is benzyl, phenyl, nitrophenyl, dinitrophenyl, halophenyl, dihalophenyl, methoxyphenyl, phenoxyphenyl, carboxyphenyl, hydroxyphenyl, aminophenyl, diphenyl, formamidophenyl, phenylsulfonylphenyl, aminosulfonylphenyl, halo-tolyl, halo-trifluoromethylphenyl, halo-methoxyphenyl, sodium salt of dihalocarboxyphenyl, halo-nitro-methoxyphenyl, dihalobenzyl, naphthyl, and anthraquinonyl, and Z represents chloro or bromo.

2. The halohydroxyacrylamide of claim 1, wherein R is 4-nitrophenyl and Z is Cl.

3. The halohydroxyacrylamide of claim 1, wherein R is 3,4-dichlorophenyl and Z is Cl.

4. The halohydroxyacrylamide of claim 1, wherein R is 3-chloro-4-methylphenyl and Z is Cl.

5. The halohydroxyacrylamide of claim 1, wherein R is phenyl and R' is methyl.

6. The halohydroxyacrylamide of claim 1, wherein R is 3-trifluoromethyl-4-chlorophenyl and Z is Cl.

7. A process for producing a compound as defined in claim 1 comprising the steps of (1) reacting an amine corresponding to the formula R(R')NH with an $\alpha,\beta$-dihaloacryloyl halide of the formula

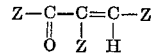

to form the corresponding dihaloacrylamide, and (2) hydrolyzing said dihaloacrylamide to said desired compound in the presence of water, water-soluble organic solvent and a trialkylamine catalyst, steps (1) and (2) being conducted in the presence of an acid acceptor base, and R, R' and Z having the values as defined in claim 1.

8. The process of claim 2 wherein said acid acceptor base is selected from the group consisting of an aliphatic tertiary amine, alkali and alkaline earth hydroxide, carbonate, and bicarbonate.

References Cited

UNITED STATES PATENTS 3,510,516    5/1970    Schulenberg _____ 260—562

HENRY R. JILES, Primary Examiner

H. I. MOATZ, Assistant Examiner

U.S. Cl. X.R.

71—82, 118; 260—247.7 H, 287 R, 268 C, 294.7 E, 315, 326.5 E, 326.8, 397.6, 397.7, 518 A, 556 AR